United States Patent [19]

Yamamoto et al.

[11] Patent Number: 5,475,057

[45] Date of Patent: * Dec. 12, 1995

[54] CATIONICALLY ELECTRODEPOSITABLE FINELY DIVIDED GELLED POLYMER AND PROCESS FOR PRODUCING SAME

[75] Inventors: Kenji Yamamoto; Haruo Nagaoka; Teiji Katayama; Tadayoshi Hiraki; Kiyoshi Kato, all of Hiratsuka, Japan

[73] Assignee: Kansai Paint Co., Ltd., Hyogo, Japan

[*] Notice: The portion of the term of this patent subsequent to Oct. 19, 2010, has been disclaimed.

[21] Appl. No.: 561,501

[22] Filed: Aug. 1, 1990

[30] Foreign Application Priority Data

Aug. 1, 1989 [JP] Japan ..................... 1-197929
Oct. 13, 1989 [JP] Japan ..................... 1-265160

[51] Int. Cl.$^6$ .......................... C08F 8/30; C08F 283/12
[52] U.S. Cl. .................. 525/131; 525/124; 525/126; 525/278; 525/288; 525/479; 525/902
[58] Field of Search .......................... 525/124, 126, 525/288, 278, 530, 902

[56] References Cited

U.S. PATENT DOCUMENTS

| | | | |
|---|---|---|---|
| 3,689,593 | 9/1972 | Jackson | 525/126 |
| 4,845,171 | 4/1989 | Gmose et al. | 525/452 |
| 4,987,178 | 1/1991 | Shibata et al. | 524/547 |
| 5,254,631 | 10/1993 | Yamamoto et al. | 525/278 |

*Primary Examiner*—Paul J. Thibodeau
*Assistant Examiner*—Mary Critharis
*Attorney, Agent, or Firm*—Wenderoth, Lind & Ponack

[57] ABSTRACT

A cationically electrodepositable finely divided gelled polymer obtained by, in the first step, emulsion polymerizing (A) a monomer component comprising (a) a polymerizable unsaturated vinylsilane monomer containing a vinylic double bond and a hydrolyzable alkoxysilane group, (b) a polymerizable monomer having at least two radically polymerizable unsaturated groups in a molecule, (c) a polymerizable unsaturated monomer having a vinylic double bond and a hydroxyl group, and (d) another polymerizable unsaturated monomer using a cationically reactive emulsifying agent having an allyl group in a molecule; and in the second step, emulsion polymerizing a monomer component (B) comprising (e) a blocked monoisocyanate or polyisocyanate in which at least one isocyanate group in a molecule is blocked with a radically polymerizable monohydroxy compound, (f) a polymerizable unsaturated monomer having a vinylic double bond and a hydroxyl group, and (g) another polymerizable unsaturated monomer in the presence of an aqueous finely divided gelled polymer obtained in the first step, said polymer having a core-sheath structure in which the polymerized product of the monomer component (A) is the core and the polymerized product of the monomer component (B) is the sheath, and process for producing same.

17 Claims, No Drawings

CATIONICALLY ELECTRODEPOSITABLE FINELY DIVIDED GELLED POLYMER AND PROCESS FOR PRODUCING SAME

DETAILED DESCRIPTION OF THE INVENTION

This invention relates to a cationically electrodepositable finely divided gelled polymer and a process for producing same. More specifically, this invention relates to a cationically electrodepositable finely divided gelled polymer formed by emulsion polymerization using a cationic reactive emulsifying agent and having a core-sheath structure containing a hydrolyzable alkoxysilane group and a hydroxyl group as a core component and a urethane linkage and a hydroxyl group as a sheath component, and a process for producing a cationically electrodepositable finely divided gelled polymer having good polymerization stability by conducting the emulsion polymerization in the presence of a water-soluble azoamide compound as a polymerization initiator.

Finely divided polymers gelled by crosslinking reactions in the particles and processes for producing the same have been so far widely known. For example, there are a process in which a monomer mixture containing a monomer for crosslinking containing at least two ethylenic double bonds is emulsion polymerized in an aqueous medium (British Patent No. 967,051 and European Patent Application Publicaiton No. 259181A), and a process in which a monomer mixture containing glycidyl (meth)acrylate and (meth)acrylic acid is dispersion polymerized in the presence of a dispersion stabilizer in a non-aqueous medium, and simultaneously these functional groups are reacted (U.S. Pat. No. 4,025,474). Especially, as a process for producing a polymer in an aqueous medium using an alkoxysilane monomer, there are proposed a process in which a mixture of an alkoxy silane monomer and the another monomer is emulsion polymerized in an aqueous medium using a non-reactive surface active agent (European Patent Application Publication No. 153,600A), a process for obtaining a delustered electrodeposition-coated film for aluminum building material in which an alkoxysilane monomer, (meth)acrylic acid and another monomer are copolymerized and the resulting copolymer is then dispersed in water (Japanese Laid-open Patent Application No. 67,396/1984), a water-soluble composition obtained by combining an acrylic polymer containing an alkoxy silane group and a carboxyl group with a colloidal silica (Japanese Patent Publication No. 47,178/1986), and a process in which an acrylic copolymer containing an alkoxysilane group and a cationic group is dispersed in water and the dispersed copolymer is subjected to crosslinking in particles (European Patent Application Publication No. 282000A).

The finely divided gelled polymers obtained by the conventional processes are added to a paint composition and influence theological characteristics and physical characteristics of the paint composition, contributing to improvements in spray efficiency of the paint, prevention of sagging of the coated film and pattern control of a metallic pigment.

Meanwhile, cationically electrodepositable paints that find wide acceptance mainly in the automobile industry have per se an excellent corrosion resistance, but the coated film in the edge portion of the coated product does not become thick and is poor in edge covering property; its improvement has been demanded. In order to solve the above problem, the present inventors have made investigations to apply the aforesaid finely divided gelled polymer to the cationically electrodepositable paint. Nevertheless, most of the known finely divided gelled polymers are non-aqueous dispersions or aqueous dispersions of an anionic or nonionic type obtained by emulsion polymerization using a non-reactive surface active agent, and it is usually difficult to apply them to a cationically electrodepositable paint. Even if they are applied to the cationically electrodepositable paint, the stability of an electrodeposition coating bath and electrodepositable characteristics as well as a water resistance and a corrosion resistance of the coated film are impaired. Accordingly, they cannot endure the practical use in this field.

On the other hand, the present inventors have proposed an internally crosslinked, finely divided gelled polymer having an alkoxysilane group, a hydroxyl group and a cationic group, and a process for producing same (UK Patent Application No. 2,221,689A and DE-OS 3926326). Said internally crosslinked, finely divided gelled polymer has cationically electrodepositable characteristics. Even if said polymer is added to a cationically electrodepositable paint, the stability of a bath and electrodepositable characteristics are not impaired. The backed, coated film is excellent in edge covering property but is still a bit inferior in corrosion resistance and thus unsatisfactory in practical use.

The present inventors have made extensive studies to develop a cationically electrodepositable finely divided gelled polymer useful as a theology controlling agent for a cationically electrodepositable paint, and consequently have found that a cationically electrodepositable finely divided gelled polymer obtained by emulsion polymerization using a cationic reactive emulsifying agent and having a core-sheath structure containing a hydrolyzable alkoxysilane group, an urethane linkage and a hydroxyl group as a core component and an urethane linkage and a hydroxyl group as a sheath component is quite effective for solving the aforesaid problem.

The present inventors have further found that if a cationically electrodepositable finely divided gelled polymer obtained by emulsion polymerization using a cationic reactive emulsifying agent and having a core-sheath structure containing a hydrolyzable alkoxysilane group, an urethane linkage and a hydroxyl group as a core component and an urethane linkage, an amino group and a hydroxyl group as a sheath component is added in a small amount to a cationically electrodepositable paint, an excellent edge covering property can be exhibited.

The present inventors have still further found that the finely divided gelled polymer having the core-sheath structure has cationically electrodepositable characteristics and even if added to the cationically electrodepositable paint, it does not impair the stability of the bath and the electrodepositable characteristics. The urethane linkage of the sheath component is condensed with the hydroxyl group in baking to allow crosslinking between particles and crosslinking with the base resin and at the same time the silanol group of the core component also partially takes part in the crosslinking reaction. The result is that said polymer is extremely effective for improving the prevention of cissing, the edge covering property, the adhesion, and the chipping resistance of the cationically electrodeposition-coated film without impairing the water resistance, the corrosion resistance and the surface smoothness of the coated film, and the edge covering property does not decrease with the lapse of time. This finding has led to completion of this invention.

Thus, according to one aspect of this invention, there is provided a cationically electrodepositable finely divided gelled polymer obtained by, in the first step, emulsion polymerizing (A) a monomer component comprising (a) a polymerizable unsaturated vinylsilane monomer having a vinylic double bond and a hydrolyzable alkoxysilane group, (b) a polymerizable monomer having at least two radically polymerizable unsaturated groups in a molecule, (c) a polymerizable unsaturated monomer having a vinylic double bond and a hydroxyl group, and (d) another polymerizable unsaturated monomer using a cationic reactive emulsifying agent having an allyl group in a molecule; and in the second step, emulsion polymerizing a monomer component (B) comprising (e) a blocked monoisocyanate or polyisocyanate in which at least one isocyanate group in a molecule is blocked with a radically polymerizable monohydroxy compound, (f) a polymerizable unsaturated monomer having a vinylic double bond and a hydroxyl group, and (g) another polymerizable unsaturated monomer in the presence of an aqueous finely divided gelled polymer obtained in the first step, said polymer having a core-sheath structure in which the polymerized product of the monomer component (A) is the core and the polymerized product of the monomer component (B) is the sheath.

According to another aspect of this invention, there is provided a process for producing a cationically electrodepositable finely divided gelled polymer, which comprises, in the first step, emulsion polymerizing (A) a monomer component comprising (a) a polymerizable unsaturated vinylsilane monomer having a vinylic double bond and a hydrolyzable alkoxysilane group, (b) a polymerizable monomer having at least two radically polymerizable unsaturated group in a molecule, (c) a polymerizable unsaturated monomer having a vinylic double bond and a hydroxyl group, and (d) another polymerizable unsaturated monomer using a cationically reactive emulsifying agent having an allyl group in a molecule; and in the second step, emulsion polymerizing a monomer component (B) comprising (e) a blocked monoisocyanate or polyisocyanate in which at least one isocyanate group in a molecule is blocked with a radically polymerizable monohydroxy compound, (f) a polymerizable unsaturated monomer having a vinylic double bond and a hydroxyl group, and (g) another polymerizable unsaturated monomer in the presence of an aqueous finely divided gelled polymer obtained in the first step, a water-soluble azoamide compound being used as a polymerization initiator in the emulsion polymerization.

In this invention, the monomer component (A) constituting the core component of the cationically electrodepositable finely divided gelled polymer comprises (a) a polymerizable unsaturated vinylsilane monomer having a vinylic double bond and a hydrolyzable alkoxysilane group, (b) a polymerizable monomer having at least two radically polymerizable unsaturated groups in a molecule, (c) a polymerizable unsaturated monomer having a vinylic double bond and a hydroxyl group, and (d) another polymerizable unsaturated monomer.

The monomer component (B) constituting the sheath component of the cationically electrodepositable finely divided gelled polymer comprises (e) a blocked monoisocyanate or polyisocyanate in which at least one isocyanate group in a molecule is blocked with a radically polymerizable monohydroxy compound, (f) a polymerizable unsaturated monomer having a vinylic double bond and a hydroxyl group, and (g) another polymerizable unsaturated monomer.

They will be explained in more detail below.

Monomer component (A) [core component]:

The vinylsilane monomer (a) is a compound represented the formula

wherein Q denotes a polymerizable unsaturated group such as a gamma-methacryloxypropyl group or a vinyl group, and R denotes an acetoxy group or an alkoxy group having 1 to 8 carbon atoms.

In formula (I), the "alkoxy group" represented by R is used in a broad sense. Examples of the alkoxy group include ordinary alkoxy groups such as methoxy, ethoxy, propoxy, butoxy, isobutoxy, pentoxy and hexoxy; alkoxyalkoxy groups such as methoxymethoxy and ethoxymethoxy; alkoxyallyloxy groups such as methoxyallyloxy and ethoxyallyloxy; and alkoxyphenoxy groups such as methoxyphenoxy and ethoxyphenoxy. The preferable group of R is the methoxy or ethoxy group. The silane monomer is a monomer known per se and produced similarly to the known monomer. Concrete examples of the silane monomer (a) include vinyltrimethoxysilane, vinyltriethoxysilane, vinyltris(2-methoxyethoxy)silane, gamma-methacryloxypropyltrimethoxysilane and vinyltriacetoxysilane. Among them, gamma-methacryloxypropyltrimethoxysilane is especially preferable.

The polymerizable monomer (b) having at least two radically polymerizable unsaturated groups in the molecule includes a polymerizable unsaturated monocarboxylic acid ester of a polyhydric alcohol, a polymerizable unsaturated alcohol ester of a polybasic acid and an aromatic compound replaced with two or more vinyl groups (e.g. divinylbenzene). Examples of the polyhydric alcohol include alkylene glycols having 2 to 6 carbon atoms and aliphatic polyhydric alcohols having 3 to 6 carbon atoms and at least three hydroxyl groups in a molecule, such as glycerol, trimethylolpropane, pentaerythritol and 1,1,1-tris(hydroxymethyl)alkane. Examples of the polymerizable unsaturated monocarboxylic acid that forms an ester therewith include acrylic acid, methacrylic acid and crotonic acid.

Examples of the polybasic acid include cyanuric acid, isocyanuric acid, phthalic acid, terephthalic acid, trimellitic acid, trimesic acid and pyromellitic acid. A typical example of the polymerizable unsaturated alcohol is allyl alcohol.

Thus, examples of the polymerizable monomer (b) include ethylene glycol diacrylate, ethylene glycol dimethacrylate, triethylene glycol dimethacrylate, tetraethylene glycohol dimethacrylate, 1,3-butylene glycol dimethacrylate, trimethylolpropane triacrylate, trimethylolpropane trimethacrylate, 1,4-butanediol diacrylate, neopentylglycol diacrylate, 1,6-hexanediol diacrylate, pentaerythritol diacrylate, pentaerythritol triacrylate, pentaerythritol tetraacrylate, pentaerythritol dimethacrylate, pentaerythritol trimethacrylate, pentaerythritol tetramethacrylate, glycerol dimethacrylate, glycerol diacrylate, glycerol allyloxydimethacrylate, 1,1,1-tris(hydroxymethyl)ethane diacrylate, 1,1,1-tris(hydroxymethyl)ethane triacrylate, 1,1,1-tris(hydroxymethyl)ethane dimethacrylate, 1,1,1-tris(hydroxymethyl)ethane trimethacrylate, 1,1,1-tris(hydroxymethyl)propane diacrylate, 1,1,1-tris(hydroxymethyl)propane triacrylate, 1,1,1-tris(hydroxymethyl)propane dimethacrylate, 1,1,1-tris(hydroxymethyl)propane trimethacrylate, triallyl cyanurate, triallyl isocyanurate, triallyl trimellitate, diallyl terephthalate, diallyl phthalate and divinylbenzene.

The polymerizable monomer (b) having at least two radically polymerizable unsaturated groups in a molecule further includes blocked polyisocyanates in which at least two isocyanate groups are blocked by a blocking agent such as a radically polymerizable monohydroxy compound.

Examples of the polyisocyanates used in the blocked polyisocyanates include aromatic polyisocyanates such as toluene diisocyanate, naphthalene diisocyanate, xylylene diisocyanate, hydrogenated xylylene diisocyanate, diphenylmethane diisocyanate and dibenzyl isocyanate; aliphatic polyisocyanates such as tetramethylene diisocyanate, hexamethylene diisocyanate, dicyclohexyl diisocyanate and isophorone diisocyanate. Polymers and biurets of these polyisocyanate compounds are also available. The above polyisocyanates may be used either singly or in combination of two or more.

The blocking agent used to block the above polyisocyanates includes, for example, a radically polymerizable monohydroxy compound. Concrete examples thereof include $C_2$–$C_6$ hydroxyalkyl (meth)acrylates such as hydroxyethyl (meth)acrylate and hydroxypropyl (meth)acrylate, tri- or tetra-propylene glycol mono(meth)acrylate, trimethylolpropane di(meth)acrylate and pentaerythritol tri(meth)acrylate.

The above polymerizable monohydroxy compound can be used together with the other blocking agent. The other blocking agent includes saturated or unsaturated monoalcohols containing at least 6 carbon atoms, cellosolves, carbitols and oximes. Concrete examples thereof are saturated monoalcohols such as hexanol, nonanol, decanol, lauryl alcohol, stearyl alcohol and 2-ethylhexanol; unsaturated monoalcohols such as oleyl alcohol and linolenyl alcohol; cellosolves such as methyl cellosolve, ethyl cellosolve, butyl cellosolve and hexyl cellosolve; carbitols such as methyl carbitol, ethyl carbitol and butyl carbitol; and oximes such as methyl ethyl ketoxime and cyclohexanone oxime.

Most preferable in the polymerizable monomer (b) are ethylene glycol diacrylate, 1,6-hexanediol diacrylate, trimethylolpropane trimethacrylate, pentaerythritol triacrylate, blocked isophorone diisocyanate/2-hydroxyethyl acrylate and blocked hexamethylene diisocyanate/2-hydroxyethyl methacrylate.

The polymerizable unsaturated monomer (c) having the vinylic double bond and the hydroxyl group is a monomer component that serves to introduce the hydroxyl group into the finely divided gelled polymer, and the hydroxyl group being introduced acts as a hydrophilic group in producing the finely divided gelled polymer or a functional group in the reaction of crosslinking between dispersed particles. Preferable examples of the unsaturated monomer (c) include $C_2$–$C_6$ hydroxyalkyl (meth)acrylates such as 2-hydroxyethyl (meth)acrylate and 1-, 2- or 3-hydroxypropyl (meth)acrylate.

The other polymerizable unsaturated monomer of the monomer (d) is the rest of the monomer component (A) constituting the core component of the finely divided gelled polymer. Examples thereof can be known monomers used to form ordinary acrylic resins, for example, alkyl (preferably $C_1$–$C_{18}$ alkyl) (meth)acrylates such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and cyclohexyl acrylate; polymerizable unsaturated nitrile monomers such as (meth)acrylonitrile; vinyl aromatic monomers such as styrene, alphamethylstyrene and vinyl toluene; (meth)acrylamide; and (meth)acrylic acid amide derivatives such as (meth)acrylamide N-derivatives. These monomers are properly selected depending on the desirous characteristics and may be used either singly or in combination of two or more.

The proportions of the monomers (a) to (d) constituting the monomer component (A) [core component] of the finely divided gelled polymer in this invention are not strictly limited and can be varied depending on the desirous properties of the finely divided gelled polymer. Generally, they can be within the following range.

Monomer (a): 0.5 to 10% by weight, preferably 1 to 5% by weight

Monomer (b): 1 to 50% by weight, preferably 3 to 40% by weight

Monomer (c): 1 to 30 % by weight, preferably 2 to 10% by weight

Monomer (d): 10 to 97.5% by weight, preferably 45 to 94% by weight.

Monomer component (B) [sheath component]

The blocked mono- or poly-isocyanate (e) in which at least one isocyanate group is blocked with the radically polymerizable monohydroxy compound, said isocyanate (e) constituting the monomer component (B), is an important component to improve the prevention of cissing, the adhesion and the chipping resistance of the cationically electrodeposition-coated film without impairing the water resistance, the corrosion resistance and the coated surface smoothness of the coated film.

Examples of the monoisocyanate in the component (e) include aromatic monoisocyanates such as phenyl isocyanate, p-chlorophenyl isocyanate, o-chlorophenyl isocyanate, m-chlorophenyl isocyanate, 3,4-dichlorophenyl isocyanate and 2,5-dichlorophenyl isocyanate; and aliphatic monoisocyanates such as methyl isocyanate, ethyl isocyanate, n-butyl isocyanate, n-propyl isocyanate and octadecyl isocyanate. These monoisocyanates may be used either singly or in combination of two or more.

The polyisocyanates can be the same as those in the polymerizable monomer (b).

The blocking agent used to block the mono- and polyisocyanates can be also the same as that in the polymerizable monomer (b).

Preferable examples of the blocked mono- or poly-isocyanate (e) include blocked isophorone diisocyanate/2-hydroxyethyl acrylate/methyl ethyl ketoxime, blocked isophorone diisocyanate/2-hydroxyethyl acrylate/methyl isobutyl ketoxime, blocked toluylene diisocyanate/2-hydroxyethyl acrylate/methyl isobutyl ketoxime and isocyanurate-type blocked hexamethylene diisocyanate/2-hydroxyethyl acrylate/methyl isobutyl ketoxyme.

The polymerizable unsaturated monomer (f) having the vinylic double bond and the hydroxyl group can be the aforesaid examples of the unsaturated monomer (c) in the monomer component (A), for example, $C_2$–$C_6$ hydroxyalkyl (meth)acrylates such as 2-hydroxyethyl (meth)acrylate and 1-, 2- or 3-hydroxypropyl (meth)acrylate.

The other polymerizable unsaturated monomer (g) is the rest of the monomer component (B) constituting the sheath component of the finely divided gelled polymer. Examples of the monomer (g) can be, like examples of the polymerizable unsaturated monomer (d) in the monomer component (A), known monomers used to form ordinary acrylic resins, such as alkyl (meth)acrylate monomers, polymerizable unsaturated nitrile monomers, vinyl aromatic monomers and (meth)acrylic acid amide derivatives. They may be used either singly or in combination of two or more.

The proportions of the monomers (e) to (g) constituting the monomer component (B) [sheath component] are not strictly limited and can be varied depending on the desirous properties of the resulting finely divided gelled polymer. Generally, they can be within the following range.

Monomer (e): 10 to 40% by weight, preferably 15 to 30% by weight

Monomer (f): 1 to 30% by weight, preferably 2 to 10% by weight

Monomer (g): 30 to 89% by weight, preferably 60 to 83% by weight

It has been found that when a combination of
(g-1) a polymerizable unsaturated monomer having an amino group in a molecule, and
(g-2) at least one monomer selected from alkyl (meth) acrylates, polymerizable unsaturated nitrile monomers and vinyl aromatic monomers is used as the polymerizable unsaturated monomer (g), there is obtained a cationically electrodepositable finely divided gelled polymer of a core-sheath structure especially useful as a rheology controlling agent to exhibit an excellent edge covering property with the small amount of the polymer being added to a cationically electrode-positable paint.

Examples of the polymerizable unsaturated monomer (g-1) having the amino group in the molecule include a (meth)acrylic monomer in which an ester moiety of a (meth)acrylate ester contains a substituted or unsubstituted amino group, and an amino group-containing (meth)acrylic monomer in which an amido moiety of (meth)acrylic acid contains a substituted amino group.

Especially suitable is at least one type selected from an aminoalkyl (meth)acrylate and an aminoalkyl (meth)acrylamide represented by formulas (I) and (II)

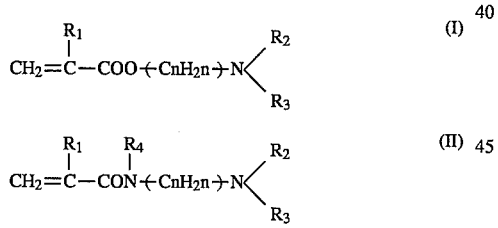

wherein $R_1$ denotes a hydrogen atom or a methyl group, $R_2$ and $R_3$, independently from each other, denote a hydrogen atom or a lower alkyl group, $R_4$ denotes a hydrogen atom or a lower alkyl group, and n is an integer of 2 to 8.

The word "lower" here referred to means that the number of carbon atoms of the group to which this word is applied is 6 or less, preferably 4 or less.

Regarding concrete examples of such amino group-containing (meth)acrylic monomer, examples of the aminoalkyl (meth)acrylate represented by formula (I) include N,N-dimethylaminoethyl (meth)acrylate, N,N-diethylaminoethyl (meth)acrylate, N-t-butylaminoethyl (meth)acrylate, N,N-dimethylaminopropyl (meth)acrylate, N,N-dimethylaminobutyl (meth)acrylate, N-propylaminoethyl (meth)acrylate and N-butylaminoethyl (meth)acrylate. Examples of the aminoalkyl (meth)acrylamide represented by formula (II) include N,N-dimethylaminoethyl (meth)acrylamide and N,N-dimethylaminopropyl (meth)acrylamide.

Examples of the alkyl (meth)acrylate monomer (g-2) used in combination with the monomer (g-1) include $C_1$-$C_{18}$ alkyl esters of (meth)acrylic acid such as methyl (meth)acrylate, ethyl (meth)acrylate, propyl (meth)acrylate, isopropyl (meth)acrylate, butyl (meth)acrylate, hexyl (meth)acrylate, octyl (meth)acrylate, lauryl (meth)acrylate and cyclohexyl acrylate.

The polymerizable unsaturated nitrile monomer (g-2) includes, for example, (meth)acrylonitrile, and the vinyl aromatic monomer (g-2) includes, for example, styrene, alpha-methylstyrene and vinyl toluene. These monomers are also properly selected depending on the desirous characteristics. They may be used either singly or in combination of two or more.

The proportions of (e), (f), (g-1) and (g-2) constituting the sheath portion (B) in case of using a combination of the monomers (g-1) and (g-2) as the monomer (g) are not strictly limited either and can be varied depending on the desirous properties of the resulting finely divided gelled polymer. They can generally be within the following range:

Monomer (e): 10 to 40% by weight, preferably 15 to 30% by weight

Monomer (f): 1 to 30% by weight, preferably 2 to 10% by weight

Monomer (g-1): 1 to 10% by weight, preferably 2 to 5% by weight

Monomer (g-2): 20 to 88% by weight, preferably 55 to 81% by weight

Preparation of a finely divided gelled polymer it is also one of the important requirements in this invention to select the proportions of the monomer component (A) [core component] and the monomer component (B) [sheath component]. In this invention, it is advisable that the weight ratio ((A)/(B)) of the sum of the monomer component (A) to the sum of the monomer component (B) is usually 10/90 to 90/10, preferably 40/60 to 60/40. If the (A)/(B) weight ratio is less than 10/90 or more than 90/10, the edge covering property of the resulting baked, coated film tends to decrease.

In this invention, a typical example of the cationic reactive emulsifying agent having an allyl group in a molecule which is used in emulsion polymerizing the monomer component (A) is a quaternary ammonium salt-containing reactive emulsifying agent represented by formula (III)

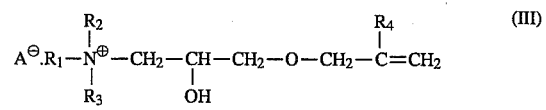

wherein $R_1$ denotes a hydrocarbon group with 8 to 22 carbon atoms that may have a substituent, $R_2$ and $R_3$ each denote an alkyl group with 1 to 3 carbon atoms, $R_4$ denotes a hydrogen atom or a methyl group, and $A^{\ominus}$ denotes a monovalent anion.

The above emulsifying agent is known per se (refer to e.g. Japanese Laid-open Patent Application No. 78,947/1985). For example, an emulsifying agent commercially available under the tradename "Ratemuru K-180" of Kao Corporation can be used. In this invention, a cationic reactive emulsifying agent that is gradually incorporated into a polymer during the polymerization is especially preferable. Any cationic reactive emulsifying agent containing an allyl group of a relatively low reactivity can widely be used; the aforesaid emulsifying agents are not critical. The amount of the allyl group-containing cationic reactive emulsifying agent is not strictly limited and can be changed depending on the type of the monomer component (A) and the desirous properties of the resulting finely divided gelled polymer. It is usually 0.1 to 30 parts by weight, preferably 0.5 to 5 parts by weight per 100 parts by weight of the solids content of the finely divided gelled polymer.

Especially preferable as a polymerization initiator is a water-soluble azoamide compound represented by formula (IV) or (V),

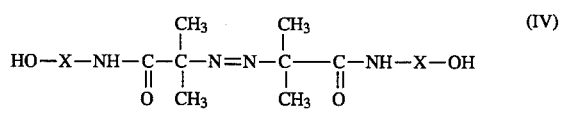

wherein x denotes a linear or branched alkylene group with 2 to 12 carbon atoms, or

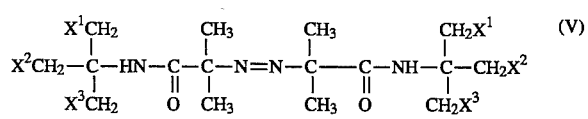

wherein at least one of $X^1$, $X^2$ and $X^3$ denotes a hydroxyl group and the others denote hydrogen.

These compounds are known per se (refer to e.g. Japanese Laid-open Patent Application No. 218,618/1986 and No. 63,643/1986). For example, a polymerization initiator commercially available under the tradename "VA Series" of Wako Pure Chemical Ind., Ltd. can be used. The polymerization initiator can be used in an amount commonly employed in said technical field. It is usually 0.1 to 1.5 parts by weight, preferably 0.5 to 1.5 parts by weight per 100 parts by weight of the solids content of the finely divided gelled polymer.

Copolymerization of the unsaturated monomers (a) to (d) and (e) to (g) can be conducted by an emulsion polymerization method known per se for producing an acrylic copolymer. First, the mixture [monomer component (A)] of the above monomers (a) to (d) is, for example, reacted usually at a reaction temperature of about 50 to about 100° C. for about 1 to about 20 hours in an aqueous medium in the presence of an allyl group-containing cationic reactive emulsifying agent and a water-soluble azoamide compound as a reaction initiator to form an aqueous finely divided gelled polymer.

Subsequently, the mixture [monomer component (B)] of the monomers (e) to (g) is added and the reaction further continues at a reaction temperature of about 50 to about 100° C. for about 1 to about 20 hours. There can be obtained a cationically electrodepositable finely divided gelled polymer having a core-sheath structure of this invention.

The aqueous dispersion of the cationically electrodepositable finely divided gelled polymer in this invention has usually a resin solids content of about 10 to 40% by weight based on the total weight. The finely divided gelled polymer can have a particle size of usually 500 nm or less, preferably 10 to 300 nm, more preferably 50 to 100 nm. The particle size can be adjusted by adjusting the amount of the cationically reactive emulsifying agent containing an allyl group in a molecule. A desirable amount can readily be obtained.

The cationically electrodepositable finely divided gelled polymer of this invention can be added to an ordinary cationically electrodepositable paint. On this occasion, the finely divided gelled polymer is electrodeposited without posing problems of coagulation, abnormal electrodeposition and sedimentation. Said finely divided gelled polymer acts as a rheology controlling agent when heat-curing the electrodeposition coated film, exhibiting an excellent effect of prevention of cissing and an excellent effect of an edge covering effect. Moreover, the coated film formed from the cationically electrodepositable paint containing the finely divided gelled polymer of this invention forms a microseparating structure, and the properties of the coated film are greatly improved.

The following Preparation Examples, Examples, Comparative Examples and Application Examples illustrate this invention specifically. In said Examples, "parts" and "%" are all by weight.

Preparation of a radically polymerizable blocked isocyanate monomer

PREPARATION EXAMPLE 1

A 2-liter flask fitted with a stirrer, an air introduction tube, a condensing pipe and a thermostat was charged with 222 parts of isophorone diisocyanate and 50 parts of methyl isobutyl ketone. While blowing a dry air into a liquid phase, they were stirred and heated to 70° C. To the mixture was added 0.3 part of dibutyltin dilaurate, followed by adding dropwise 232 parts of 2-hydroxyethyl acrylate for 1 hour. Even after the dropwise addition, the mixture was heated and kept at 70° C. The reaction mixture was collected with the lapse of time and absorption of -NCO was ascertained by IR. A time when the absorption of -NCO disappeared was made the termination of the reaction. There resulted a blocked 90% isophorone diisocyanate/2-hydroxyethyl acrylate solution. The 70% solids content bubble viscosity (solvent composition: 10% of methyl isobutyl ketone and 20% of n-butyl acrylate) was GH.

PREPARATION EXAMPLE 2

A 2-liter flask fitted with a stirrer, an air introduction tube, a condensing pipe and a thermostat was charged with 222 parts of isophorone diisocyanate and 50 parts of methyl isobutyl ketone. While blowing a dry air into a liquid phase, they were stirred and heated to 70° C. To the mixture was added 0.3 part of dibutyltin dilaurate, followed by adding dropwise 116 parts of 2-hydroxyethyl acrylate for 1 hour. Even after the dropwise addition, the temeprature was kept at 70° C. for 1 hour. Subsequently, 115 parts of methyl isobutyl ketoxime was added dropwise for 1 hour. Even after the dropwise addition, heating was conducted to keep the temperature at 70° C. The reaction mixture was collected with the lapse of time. Absorption of -NCO was ascertained by IR. A time when absorption of -NCO disappeared was made the termination of the reaction. There was obtained a blocked 90% isophorone diisocyanate/2-hydroxyethyl acrylate/methyl isobutyl ketoxime solution. The 70% solids content buble viscosity (solvent composition: 10% of methyl isobutyl ketone and 20% of n-butyl acrylate) was DE.

PREPARATION EXAMPLES 3 to 5

Preparation Example 2 was repeated except using starting materials shown in Table 1 to obtain 90% solutions of various radically polymerizable blocked isocyanate monomers. The 70% solids content bubble viscosities of these monomers are shown in Table 1.

TABLE 1

| Starting material | Amount (parts) Preparation Example | | | |
|---|---|---|---|---|
| | 2 | 3 | 4 | 5 |
| methyl isobutyl ketone | 47 | 47 | 45 | 100 |
| Dibutyltin dilaurate | 0.3 | 0.3 | 0.3 | 0.6 |
| Isophorone diisocyanate | 222 | 222 | | |
| Toluylene diisocyanate | | | 174 | |
| Duranate TPA-100 *1 | | | | 550 |
| 2-Hydroxyethyl acrylate | 116 | 116 | 116 | 174 |
| methyl isobutyl ketoxime | 115 | | 115 | 173 |
| methyl ethyl ketoxime | | 87 | | |
| 70% solids content bubble viscosity *2 | DE | G' | H | R⁻ |

*1 Tradename for isocyanurate-type hexamethylene diisocyanate made by Asahi Chemical Industry Co., Ltd.
*2 Solvent composition: methye isobutyl ketone 10% n-butyl acrylate 20%

EXAMPLE 1

A flask fitted with a stirrer, a thermometer, a condensing pipe and a heating mantle was charged with 700 parts of deionized water and 16 parts of Ratemuru K-180 (a tradename for a product of Kao Corporation, 25% aqueous solution). With stirring, they were heated to 90° C. To the mixture was added 20% of an aqueous solution of 2 parts of VA-086 (a tradename for a product of Wako Pure Chemical Ind., Ltd.) as a polymerization initiator in 100 parts of deionized water. Fifteen minutes later, 10 parts of the mixture of the following monomers as the monomer component (A) was added.

| | parts |
|---|---|
| Styrene | 32 |
| n-Butyl acrylate | 32 |
| 1,6-Hexanediol diacrylate | 30 |
| 2-Hydroxyethyl acrylate | 4 |
| KBM-503* | 2 |

*a tradename for gamma-methacryloxypropyl trimethoxy silane of Shin-Etsu Chemical Co., Ltd.

Subsequently, the mixture was further stirred for 30 minutes, and the remaining monomer mixture as the monomer component (A) and the aqueous solution of the polymerization initiator began to be added dropwise. The monomer mixture as the monomer component (A) was fed over 1.5 hours and the aqueous solution of the polymerization initiator over 4.5 hours respectively. While keeping the polymerization temperature at 90° C. for 1 hour even after the dropwise addition of the monomer mixture as the monomer component (A), the mixture of the following monomers as the monomer component (B) began to be added dropwise.

| | parts |
|---|---|
| Styrene | 36 |
| n-Butyl acrylate | 36 |
| 2-Hydroxyethyl acrylate | 4 |
| N,N-dimethylaminoethyl methacrylate | 4 |
| Monomer solution obtained in Preparation Example 2 | 22 |

The monomer mixture as the monomer component (B) was fed over 1.5 hours. Even after the dropwise addition of the aqueous solution of the polymerization initiator, heating was conducted for 30 minutes to keep the temperature at 90° C. Thereafter, the temperature was lowered to room temperature, and the reaction mixture was filtered via a filter cloth. There resulted a finely divided gelled polymer dispersion having a solids content of 20.0%, pH of 5.4, a viscosity of 50 cps (BM-type rotary viscometer, No. 2 spindle) and an average particle size of 80 nm (measured by Nanosizer N-4 manufactured by Coulter Co).

EXAMPLES 2 to 10 and COMPARATIVE EXAMPLES 1 to 4

Emulsion polymerization was performed as in Example 1 except that the initial amount of deionized water, the type of the polymerization initiator, the composition of the monomer component (A), the composition of the monomer component (B) and the component (A) to component (B) ratio were changed as shown in Table 2. There resulted dispersions of finely divided gelled polymers having properties shown in Table 2.

COMPARATIVE EXAMPLE 5

A 1-liter flask fitted with a stirrer, a thermometer, a condensing pipe and a heating mantle was charged with 700 parts of deionized water and 16 parts of Ratemuru K-180, and they were heated to 90° C. with stirring. To the mixture was added 20% of an aqueous solution of 2 parts of VA-086 as a polymerization initiator in 100 parts of deionized water. Fifteen minutes later, 10 parts of the mixture of the following monomers was added.

| | parts |
|---|---|
| Styrene | 70 |
| n-Butyl acrylate | 70 |
| 2-Hydroxyethyl acrylate | 8 |
| KBM-503 | 2 |
| Monomer solution obtained in Preparation Example 1 | 52 |

Subsequently, the mixture was further stirred for 30 minutes, and the remaining monomer mixture and aqueous solution of the polymerization initiator began to be added dropwise. The monomer mixture was fed over 3 hours and the solution of the polymerization initiator over 3.5 hours, respectively. The polymerization temperature was kept at 90° C. Even after the dropwise addition of the aqueous solution of the polymerization initiator, heating was conducted for 30 minutes and the temperature was kept at 90° C. Thereafter, the temperature was lowered to room temperature, and the reaction mixture was filtered via a filter cloth to afford a finely divided gelled polymer dispersion having a solids content of 20.0%, pH of 3.5, a viscosity of 110 cps (BM-type rotary viscometer, No. 2 spindle) and an average particle size of 70 nm.

TABLE 2

|  |  | Example |  |  |  |  |  |  |  |  |
|---|---|---|---|---|---|---|---|---|---|---|
|  |  | 2 | 3 | 4 | 5 | 6 | 7 | 8 | 9 | 10 |
| Initial amount of deionized water |  | 700 | 700 | 700 | 700 | 700 | 700 | 700 | 700 | 700 |
| Ratemuru K-180 #1 |  | 16 | 16 | 16 | 16 | 16 | 16 | 16 | 16 | 16 |
| Type of polymerization initiator *2 |  | VA-086 | VA-086 | VA-086 | VA-086 | VA-086 | VA-086 | VA-086 | VA-086 | VA-086 |
| Component (A) | Styrene | 32 | 32 | 32 | 32 | 32 | 32 | 32 | 32 | 32 |
|  | n-Butyl acrylate | 32 | 32 | 32 | 32 | 32 | 32 | 32 | 32 | 32 |
|  | 1,6-hexanediol diacrylate Solution in Preparation Example 1 | 30 | 30 | 30 | 30 | 30 | 30 | 30 | 30 |  |
|  | 2-Hydroxyethyl acrylate | 4 | 4 | 4 | 4 | 4 | 4 | 4 | 4 | 4 |
|  | KBM-503 | 2 | 2 | 2 | 2 | 2 | 2 | 2 | 2 | 2 |
|  |  |  |  |  |  |  |  |  |  | 30 |
| Component (B) | Styrene | 36 | 36 | 36 | 36 | 38 | 38 | 38 | 38 | 38 |
|  | n-Butyl acrylate | 36 | 36 | 36 | 36 | 38 | 38 | 38 | 38 | 38 |
|  | 2-Hydroxyethyl acrylate | 4 | 4 | 4 | 4 | 4 | 4 | 4 | 4 | 4 |
|  | N,N'-dimethylaminoethyl methacrylate |  | 4 | 4 | 4 |  |  |  |  |  |
|  | N,N'-dimethylaminopropyl methacrylate | 4 |  |  |  |  |  |  |  |  |
|  | Solution in Preparation Example 2 | 22 |  |  |  | 22 | 22 |  |  | 22 |
|  | Solution in Preparation Example 3 |  | 22 |  |  |  |  | 22 |  |  |
|  | Solution in Preparation Example 4 |  |  | 22 |  |  |  |  | 22 |  |
|  | Solution in Preparation Example 5 |  |  |  | 22 |  |  |  |  |  |
| Component (A) / Component (B) ratio |  | 50/50 | 50/50 | 50/50 | 50/50 | 50/50 | 50/50 | 50/50 | 50/50 | 50/50 |
| Properties of finely divided gelled polymer dispersion | Solids content (%) | 19.9 | 19.9 | 20.1 | 20.0 | 20.0 | 20.0 | 19.9 | 20.0 | 20.0 |
|  | PH | 5.9 | 5.1 | 5.0 | 5.1 | 3.9 | 3.9 | 3.7 | 3.4 | 3.5 |
|  | Viscosity (cps) *3 | 40 | 30 | 51 | 46 | 50 | 50 | 25 | 20 | 50 |
|  | Average particle size *4 | 82 | 85 | 79 | 80 | 74 | 74 | 72 | 74 | 80 |

|  |  | Comparative Example |  |  |  |  |
|---|---|---|---|---|---|---|
|  |  | 1 | 2 | 3 | 4 | 5 |
| Initial amount of deionized water |  | 700 | 700 | 700 | 700 | 700 |
| Ratemuru K-180 #1 |  | 16 | 16 | 16 | 16 | 16 |
| Type of polymerization initiator *2 |  | VA-086 | VA-086 | VA-086 | VA-086 | VA-086 |
| Component (A) | Styrene | 33 | 34 | 47 | 32 | 34 |
|  | n-Butyl acrylate | 33 | 34 | 47 | 32 | 34 |
|  | 1,6-hexanediol diacrylate Solution in Preparation Example 1 | 30 | 30 |  | 30 | 30 |
|  | 2-Hydroxyethyl acrylate | 4 |  | 4 | 4 | 8 |
|  | KBM-503 |  | 2 | 2 | 2 | 2 |
| Component (B) | Styrene | 38 | 40 | 38 | 48 | 40 |
|  | n-Butyl acrylate | 38 | 40 | 38 | 48 | 40 |
|  | 2-Hydroxyethyl acrylate | 4 |  | 4 | 4 |  |
|  | N,N'-dimethylaminoethyl methacrylate |  |  |  |  |  |
|  | N,N'-dimethylaminopropyl methacrylate |  |  |  |  |  |
|  | Solution in Preparation Example 2 |  |  |  |  |  |
|  | Solution in Preparation Example 3 | 22 | 22 | 22 |  |  |
|  | Solution in Preparation Example 4 |  |  |  |  |  |
|  | Solution in Preparation Example 5 |  |  |  |  |  |
| Component (A) / Component (B) ratio |  | 50/50 | 50/50 | 50/50 | 50/50 | 50/50 |
| Properties of finely divided gelled polymer dispersion | Solids content (%) | 19.9 | 20.1 | 20.1 | 20.0 | 20.0 |
|  | PH | 3.7 | 3.7 | 3.6 | 3.7 | 3.5 |
|  | Viscosity (cps) *3 | 20 | 18 | 25 | 30 | 110 |
|  | Average particle size *4 | 76 | 75 | 77 | 71 | 70 |

*1 Tradename for quaternary ammonium salt-type allyl group-containing cationic reactive emulsifying agent made by Kao Corporation
*2 VA-086: 2,2'-azobis[2-methyl-N-(2-hydroxy-ethyl)]-propionamide TABLE 2-continued

*3 BM-type rotary viscometer NO. 2 spindle
*4 measured by nanosizer of Coulter Co.

APPLICATION EXAMPLE 1

Fifty parts of the finely divided gelled polymer having the solids content of 20% which was obtained in Example 1 and 139.4 parts of a pigment paste having a solids content of 43% which was shown in Table 3 were added with stirring to 572 parts of a clear emulsion for cationic electrodeposition ("Electron 9450, a tradename for a product of Kansai Paint Co., Ltd.) comprising a polyamide-modified epoxy resin and a completely blocked diisocyanate and having a solids content of 35%, and diluted with 588.5 parts of deionized water to obtain a cationically electrodepositable paint.

TABLE 3

|  | Pigment paste |
| --- | --- |
| Modified epoxy resin | 5 |
| Titanium oxide | 14 |
| Purified clay | 10 |
| Carbon black | 1 |
| Deionized water | 39.7 |
| Total | 69.7 |

APPLICATION EXAMPLES 2 to 6

A cationically electrodepositable paint was obtained as in Application Example 1 except using 50 parts of each of the dispersions obtained in Examples 2 to 6 as a finely divided gelled polymer.

APPLICATION EXAMPLES 7 to 15

Seventy five parts of each of the finely divided gelled polymers having the solids content of 20% which were obtained in Examples 7 to 10 and Comparative Examples 1 to 5 and 139.4 parts of each of pigment pastes having a solids content of 20% which were shown in Table 3 were added with stirring to 572 parts of a clear emulsion for cationic electrodeposition ("Electron 9450", a tradename for a product of Kansai Paint Co., Ltd.) comprising a polyamide-modified epoxy resin and a completely blocked diisocyanate and having a solids content of 35%, and diluted with 588.5 parts of deionized water to afford a cationically electrodepositable paint.

In each of the cationically electrodepositable paints obtained in Application Examples-1 to 15 was dipped a 0.8×300×90 mm cold-rolled dull steel plate (an angle between an edge surface and a flat portion was 45°) chemically treated with "Palbond 3030" (a tradename for a product of Nihon Parkerizing Co., Ltd., a zinc phosphatetype), and electrodeposition-coating was conducted using the above plate as a cathode. The conditions of the electrodeposition-coating were that a temperature of an electrodeposition paint bath was 30° C., pH 6.5 and a voltage 300 V, respectively. An electrodeposition-coated film having a thickness of 20 microns (based on a dry film thickness) was formed, then washed with water and baked at 185° C. for 20 minutes. The results of properties measured for this coated plate are shown in Table 4. The results of melt viscosities of the coated films are also shown in Table 4.

The cationically electrodepositable paints obtained in Application Examples 1 to 15 were stored for 1 month while being sealed and stirred at 30° C., and also subjected to the above electrodeposition test. The results are also shown in Table 4.

[Methods for measuring properties]

(*1) Melt viscosity of the coated film:

The melt viscosity of the electrodeposition-coated film in baking is evaluated from a heat flow appearance of a pensil scratch based on the melt viscosity by a measuring method using a rolling ball (according to JIS-Z-0237). The value is a minimum viscosity (centipoises).

(*2) Edge covering property

Electrodeposition-coating is conducted on a steel plate having an edge angle of 45° under such conditions that a thickness of a coated film in a flat portion becomes 20 microns, and the coated steel plate is cured under given baking conditions to produce a test plate. The test plate is put on a salt spray device such that the edge of the test plate is vertical, and a salt spray test is then continued for 168 hours in accordance with JIS-S-2371. Corrosion resistance of the edge portion after 168 hours is evaluated as follows.

⊚: Rust does not occur at all.

○: Rust slightly occurs.

X: Rust heavily occurs.

(*3) Smoothness of the coated surface:

A finishing property of the electrodeposition-coated surface is evaluated by visual observation.

○: Good

◔: Nearly good

Δ: Slightly bad (*4) Impact resistance:

An impact resistance is measured in an atmosphere of 20° C. according to JIS-K-5400-1979 6, 13, 3B. The value is a maximum height (cm) that does not cause a damage of the coated film under such conditions that a dropped weight is 500 g and a diameter of an end of an impact center is ½ inch. The maximum value is 50 cm.

(*5) Chipping resistance:

The electrodeposition-coated, baked plate is further coated with a thermosetting intermediate coat and a topcoat, and heat-cured. The resulting plate is subjected to the following test.

1) Test device: Q-G-R gravelometer (a device of Q Panel Company)

2) Stones to be air-blasted: ground stone having a diameter of 15 to 20 mm 3) volume of a stone to be air-blasted: about 500 ml 4) Pressure of a blasting air: about 4 kg/cm$^2$ 5) Temperature in test: about 20° C.

A test piece is fixed on a test piece holding base, and about 500 ml of ground stones are shot against the test piece at a blasting air pressure of about 4 kg/cm$^2$. The condition of the coated surface is then evaluated. The condition of the coated surface is evaluated by visual observation according to the following standard.

⊚ (good): A flaw due to shooting is slightly observed on part of the topcoat, and the electrodeposition-coated film is slightly peeled off.

◐(slightly bad): A flaw due to shooting is observed on the topcoat and the intermediate coat, and the electrodeposition-coated film is slightly peeled off.

Δ (bad): A flaw due to shooting is heavily observed on the topcoat and the intermediate coat and the electrodeposition-coated film is notably peeled off.

(*6) Adhesion after dipping in hot water:

After dipping in water of 40° C. for 20 days, crosscut is applied to the coated film according to JIS-K-5400-1979 6.15, and an adhesive cellophane tape is put on the surface. Said tape is abruptly peeled off and the condition of the coated surface is evaluated.

⊙: Good

Δ: An edge of the crosscut is slightly peeled off.

X: Part of the crosscut is peeled off.

(*7) Corrosion resistance:

A crosscut flaw is applied to the electrodeposition coated film by a knife until it reaches a base. The resulting coated film is subjected to a salt spray test for 840 hours according to JIS Z2371. Corrosion resistance is evaluated from a width of rust or blister from the knife flaw.

○: The maximum width of rust or blister is less than 1 mm (one side) from the crosscut portion.

◐: The maximum width of rust or blister is not less than 1 mm but less than 2 mm (one side) from the crosscut portion.

Δ: The maximum width of rust or blister is not less than 2 mm but less than 3 mm (one side) from the crosscut portion and the flat portion is notably blistered.

X: The maximum width of rust or blister is not less than 3 mm from the crosscut portion, and occurrence of the blister is observed on the overall coated surface.

TABLE 4

| Test item | | Application Example 1 | 2 | 3 | 4 | 5 | 6 | 7 | 8 | 9 | 10 |
|---|---|---|---|---|---|---|---|---|---|---|---|
| Type of dispersion | | Example 1 | 2 | 3 | 4 | 5 | 6 | 7 | 8 | 9 | 10 |
| Meet viscosity of coated film *1 | Initial | $10^6$ | $10^6$ | $10^6$ | $10^6$ | $10^6$ | $10^5$ | $10^6$ | $10^6$ | $10^6$ | $10^6$ |
| | 30° C., 1 month | $10^6$ | $10^6$ | $10^6$ | $10^6$ | $10^6$ | $10^6$ | $10^6$ | $10^6$ | $10^6$ | $10^6$ |
| End covering property *2 | Initial | ⊙ | ⊙ | ⊙ | ⊙ | ⊙ | X | ⊙ | ⊙ | ⊙ | |
| | 30° C., 1 month | ⊙ | ⊙ | ⊙ | ⊙ | ⊙ | X | ⊙ | ⊙ | ⊙ | |
| Smoothness of coated surface *3 | Initial | ○ | ○ | ○ | ○ | ○ | ○ | ○ | ○ | ○ | ○ |
| | 30° C., 1 month | ○ | ○ | ○ | ○ | ○ | ○ | ○ | ○ | ○ | ○ |
| Impact resistance *4 | Initial | 50 | 50 | 50 | 50 | 50 | 50 | 50 | 50 | 50 | 50 |
| | 30° C., 1 month | 50 | 50 | 50 | 50 | 50 | 50 | 50 | 50 | 50 | 50 |
| Chipping resistance *5 | Initial | ⊙ | ⊙ | ⊙ | ⊙ | ⊙ | ⊙ | ⊙ | ⊙ | ⊙ | ⊙ |
| | 30° C., 1 month | ⊙ | ⊙ | ⊙ | ⊙ | ⊙ | ⊙ | ⊙ | ⊙ | ⊙ | ⊙ |
| Adhesion after dipping in hot water *6 | Initial | ⊙ | ⊙ | ⊙ | ⊙ | ⊙ | ⊙ | ⊙ | ⊙ | ⊙ | ⊙ |
| | 30° C., 1 month | ⊙ | ⊙ | ⊙ | ⊙ | ⊙ | ⊙ | ⊙ | ⊙ | ⊙ | ⊙ |
| Corrosion resistance *7 | Initial | ○ | ○ | ○ | ○ | ○ | ○ | ○ | ○ | ○ | ○ |
| | 30° C., 1 month | ○ | ○ | ○ | ○ | ○ | ○ | ○ | ○ | ○ | ○ |

| Test item | | Application Example 11 | 12 | 13 | 14 | 15 |
|---|---|---|---|---|---|---|
| Type of dispersion | | Example 1 | 2 | 3 | 4 | 5 |
| Meet viscosity of coated film *1 | Initial | $10^5$ | $10^5$ | $10^4$ | $10^4$ | $10^6$ |
| | 30° C., 1 month | $10^5$ | $10^5$ | $10^4$ | $10^4$ | $10^5$ |
| End covering property *2 | Initial | ○ | ⊙ | ○ | X | ⊙ |
| | 30° C., 1 month | ○⊙ | | X | X | X |
| Smoothness of coated surface *3 | Initial | ○ | ○ | Δ | ○ | ○ |
| | 30° C., 1 month | ○ | ○ | ○ | ○ | |
| Impact resistance *4 | Initial | 40 | 20 | 40 | 20 | 50 |
| | 30° C., 1 month | 40 | 20 | 20 | 20 | 20 |
| Chipping resistance *5 | Initial | ◐ | Δ | Δ | Δ | ⊙ |
| | 30° C., 1 month | ◐ | Δ | Δ | Δ | Δ |
| Adhesion after dipping in hot water *6 | Initial | Δ | X | Δ | Δ | |
| | 30° C., 1 month | Δ | X | X | Δ | Δ |
| Corrosion resistance *7 | Initial | ◐ | Δ | Δ | Δ | ○ |
| | 30° C., 1 month | ◐ | Δ | X | Δ | X |

What we claim is:

1. A cationically electrodepositable finely divided gelled polymer obtained by, in the first step, emulsion polymerizing (A) a monomer component comprising
    (a) a polymerizable unsaturated vinylsilane monomer containing a vinylic double bond and a hydrolyzable alkoxysilane group,
    (b) a polymerizable monomer having at least two radically polymerizable unsaturated groups in a molecule,
    (c) a polymerizable unsaturated monomer having a vinylic double bond and a hydroxyl group, and
    (d) another polymerizable unsaturated monomer in the presence of a cationically reactive emulsifying agent having an allyl group in a molecule; and in the second step, emulsion polymerizing a monomer component (B) comprising
    (e) a blocked monoisocyanate or polyisocyanate in which at least one isocyanate group in a molecule is blocked with a radically polymerizable monohydroxy compound, (f) a polymerizable unsaturated monomer having a vinylic double bond and a hydroxyl group, and (g) another polymerizable unsaturated monomer in the presence of an aqueous finely divided gelled polymer obtained in the first step, said polymer having a core-sheath structure in which the polymerized product of the monomer component (A) is the core and the polymerized product of the monomer component (B) is the sheath.

2. The cationically electrodepositable finely divided gelled polymer of claim 1 wherein the monomer (a) is a compound represented by the formula $$Q-Si-(R)_3$$ 

wherein Q denotes a polymerizable unsaturated group or a vinyl group, and R denotes an acetoxy group or an alkoxy group having 1 to 8 carbon atoms.

3. The cationically electrodepositable finely divided gelled polymer of claim 2 wherein the monomer (a) is at least one selected from the group consisting of vinyltrimethoxysilane, vinyltriethoxysilane, vinyltris(2-methoxyethoxy)silane, gamma-methacryloxypropyltrimethoxysilane and vinyltriacetoxysilane.

4. The cationically electrodepositable finely divided gelled polymer of claim 1 wherein the monomer (b) is at least one selected from the group consisting of a polymerizable unsaturated monocarboxylic acid ester of a polyhydric alcohol, a polymerizable unsaturated alcohol ester of a polybasic acid, an aromatic compound substituted with two or more vinyl groups and a blocked polyisocyanate in which at least two isocyanate groups are blocked with a radically polymerizable monohydroxy compound.

5. The cationically electrodepositable finely divided gelled polymer of claim 1 wherein the monomer (c) is at least one selected from the group consisting of 2-hydroxyethyl (meth)acrylate and hydroxypropyl (meth)acrylate.

6. The cationically electrodepositable finely divided gelled polymer of claim 1 wherein the monomer (d) is at least one selected from the group consisting of an alkyl (meth)acrylate monomer, a polymerizable unsaturated nitrile monomer and a vinyl aromatic monomer.

7. The cationically electrodepositable finely divided gelled polymer of claim 1 wherein the monomer (e) is a blocked monoisocyanate in which the monoisocyanate is blocked with a polymerizable monohydroxy compound.

8. The cationically electrodepositable finely divided gelled polymer of claim 1 wherein the monomer (e) is a blocked polyisocyanate in which at least one isocyanate group of the polyisocyanate is blocked with a polymerizable monohydroxy compound.

9. The cationically electrodepositable finely divided gelled polymer of claim 1 wherein the monomer (f) is at least one selected from the group consisting of 2-hydroxyethyl (meth)acrylate and hydroxypropyl (meth)acrylate.

10. The cationically electrodepositable finely divided gelled polymer of claim 1 wherein the monomer (g) is at least one selected from the group consisting of an alkyl (meth)acrylate monomer, a polymerizable unsaturated nitrile monomer and a polymerizable vinyl aromatic monomer.

11. The cationically electrodepositable finely divided gelled polymer of claim 1 wherein the monomer component (A) comprises the monomer (a) in an amount of 0.5 to 10% by weight, the monomer (b) in an amount of 1 to 50% by weight, the monomer (c) in an amount of 1 to 30% by weight, and the monomer (d) in an amount of 10 to 97.5% by weight.

12. The cationically electrodepositable finely divided gelled polymer of claim 1 wherein the monomer component (B) comprises the monomer (e) in an amount of 10 to 40% by weight, the monomer (f) in an amount of 1 to 30% by weight, and the monomer (g) in an amount of 30 to 89% by weight.

13. The cationically electrodepositable finely divided gelled polymer of claim 1 wherein the monomer (g) is a combination of (g-1) a polymerizable unsaturated monomer containing an amino group in a molecule, and (g-2) an alkyl (meth)acrylate monomer, a polymerizable unsaturated nitrile monomer and a vinyl aromatic monomer.

14. The cationically electrodepositable finely divided gelled polymer of claim 13 wherein the monomer (g-1) is at least one compound selected from the group consisting of compounds represented by formulas (I) and (II),

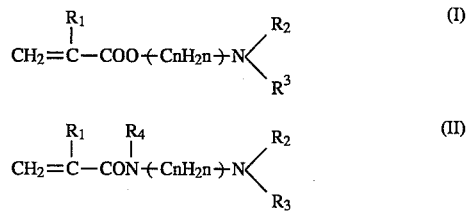

wherein $R_1$ denotes a hydrogen atom or a methyl group, $R_2$ and $R_3$, independently from each other, denote a hydrogen atom or a lower alkyl group, $R_4$ denotes a hydrogen atom or a lower alkyl group, and n is an integer of 2 to 8.

15. The cationically electrodepositable finely divided gelled polymer of claim 13 in which the monomer component (B) comprises the monomer (e) in an amount of 10 to 40% by weight, the monomer (f) in an amount of 1 to 30% by weight, the monomer (g-1) in an amount of 1 to 10% by weight, and the monomer (g-2) in an amount of 20 to 88% by weight.

16. The cationically electrodepositable finely divided gelled polymer of claim 1 wherein the monomer component (A)/monomer component (B) weight ratio is within the range of 10/90 to 90/10.

17. The cationically electrodepositable finely divided gelled polymer of claim 1 wherein the amount of the allyl group-containing cationic reactive emulsifying agent is 0.1 to 30% by weight per 100 parts by weight of the solids content of the cationically electrodepositable finely divided gelled polymer.

* * * * *